(12) United States Patent
Ding (10) Patent No.: US 7,623,062 B2
(45) Date of Patent: Nov. 24, 2009

(54) SYSTEM AND METHOD FOR TARGET DETECTION WITH A RADAR ANTENNA

(75) Inventor: Xueru Ding, Chelmsford, MA (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 11/498,122

(22) Filed: Aug. 1, 2006

(65) Prior Publication Data

US 2009/0231184 A1 Sep. 17, 2009

(51) Int. Cl.
G01S 13/00 (2006.01)
(52) U.S. Cl. .......................... 342/147; 342/70; 342/153
(58) Field of Classification Search ................ 342/147, 342/153, 196, 70–72; 343/729, 824, 876, 343/879, 893
See application file for complete search history.

(56) References Cited

U.S. PATENT DOCUMENTS

| | | | | |
|---|---|---|---|---|
| 2,907,999 | A * | 10/1959 | Wadley | 342/125 |
| 3,040,310 | A * | 6/1962 | Hausz | 342/80 |
| 3,080,559 | A * | 3/1963 | Thor et al. | 342/432 |
| 4,320,400 | A * | 3/1982 | Chasek | 342/378 |
| 4,342,997 | A * | 8/1982 | Evans | 342/156 |
| 4,961,075 | A * | 10/1990 | Ward | 342/140 |
| 5,940,029 | A * | 8/1999 | Ninomiya et al. | 342/372 |
| 6,025,800 | A | 2/2000 | Hager | 342/450 |
| 6,130,638 | A | 10/2000 | Winter et al. | 342/147 |
| 6,452,534 | B1 * | 9/2002 | Zoratti et al. | 342/70 |
| 6,452,550 | B1 | 9/2002 | Channabasappa et al. | |
| 6,509,863 | B2 * | 1/2003 | Zoratti et al. | 342/70 |
| 6,639,543 | B2 | 10/2003 | Puglia | |
| 6,720,908 | B1 | 4/2004 | Puglia | |
| 6,741,205 | B2 | 5/2004 | Nagasaku | |
| 6,853,329 | B2 * | 2/2005 | Shinoda et al. | 342/149 |
| 6,879,281 | B2 | 4/2005 | Gresham et al. | |
| 6,911,934 | B2 | 6/2005 | Henftling et al. | |
| 6,930,631 | B2 | 8/2005 | Puglia | |
| 6,933,881 | B2 | 8/2005 | Shinoda et al. | |
| 6,943,732 | B2 * | 9/2005 | Gottl et al. | 343/700 MS |
| 6,972,713 | B2 * | 12/2005 | Mosher et al. | 342/147 |
| 7,205,932 | B2 * | 4/2007 | Fiore | 342/133 |
| 2002/0075181 | A1 * | 6/2002 | Kanechika et al. | 342/175 |
| 2004/0027305 | A1 | 2/2004 | Pleva et al. | |
| 2005/0012655 | A1 * | 1/2005 | Lalezari et al. | 342/62 |

FOREIGN PATENT DOCUMENTS

| | | | |
|---|---|---|---|
| EP | 1 666 914 A1 | | 6/2006 |
| WO | WO 85/00896 | * | 2/1985 |
| WO | WO 2005/026769 A1 | * | 3/2005 |

OTHER PUBLICATIONS

European Search Report, Application No. EP 07 11 3336, Date of Application, Nov. 13, 2007.

* cited by examiner

*Primary Examiner*—Thomas H Tarcza
*Assistant Examiner*—Peter M Bythrow
(74) *Attorney, Agent, or Firm*—Sally J Brown; The Small Patent Law Group LLP (57) ABSTRACT

A system and method for controlling a radar antenna are provided. The method includes generating a first single beam antenna pattern, generating a second single beam antenna pattern and transmitting the first and second single beam antenna patterns. The method further includes using phase detection to determine angular information for a detected object based on a phase difference of received signals.

19 Claims, 5 Drawing Sheets

| Description | EEPROM Addr. | Content |
|---|---|---|
| Boresight offset | 180 | 14245 |
| residual | 181 | 0 |
| minPhase | 182 | 2480 |
| maxPhase | 183 | 19788 |
| phaseOffset | 184 | 0 |
| | 185 | 0 |
| | 186 | 0 |
| ASR_Table | 187 | 56287 |
| ASR_Table | 188 | 54231 |
| ASR_Table | 189 | 52431 |
| ASR_Table | 190 | 50632 |
| ASR_Table | 191 | 48834 |
| ASR_Table | 192 | 47291 |
| ASR_Table | 193 | 46005 |
| ASR_Table | 194 | 44464 |
| ASR_Table | 195 | 43435 |
| ASR_Table | 196 | 42151 |
| ASR_Table | 197 | 41122 |
| ASR_Table | 198 | 39837 |
| ASR_Table | 199 | 38809 |
| ASR_Table | 200 | 37781 |
| ASR_Table | 201 | 36753 |
| ASR_Table | 202 | 35725 |
| ASR_Table | 203 | 34954 |
| ASR_Table | 204 | 33926 |
| ASR_Table | 205 | 32898 |
| ASR_Table | 206 | 32127 |
| ASR_Table | 207 | 31099 |
| ASR_Table | 208 | 30327 |
| ASR_Table | 209 | 29300 |
| ASR_Table | 210 | 28272 |
| ASR_Table | 211 | 27244 |
| ASR_Table | 212 | 26216 |
| ASR_Table | 213 | 25445 |
| ASR_Table | 214 | 24417 |
| ASR_Table | 215 | 23132 |
| ASR_Table | 216 | 22104 |
| ASR_Table | 217 | 20819 |
| ASR_Table | 218 | 19534 |
| ASR_Table | 219 | 18249 |
| ASR_Table | 220 | 16708 |
| ASR_Table | 221 | 15422 |
| ASR_Table | 222 | 13881 |
| ASR_Table | 223 | 12083 |
| ASR_Table | 224 | 10540 |
| ASR_Table | 225 | 8742 |
| ASR_Table | 226 | 6943 |
| ASR_Table | 227 | 5144 |
| ASR_Table | 228 | 3344 |
| ASR_Table | 229 | 1289 |
| ASR_Table | 230 | 258 |
| ASR_Table | 231 | 1795 |
| ASR_Table | 232 | 4108 |
| ASR_Table | 233 | 6420 |
| ASR_Table | 234 | 8733 |
| ASR_Table | 235 | 11303 |
| ASR_Table | 236 | 13616 |
| ASR_Table | 237 | 16442 |
| ASR_Table | 238 | 19013 |
| ASR_Table | 239 | 21839 |
| ASR_Table | 240 | 24666 |
| ASR_Table | 241 | 27493 |
| ASR_Table | 242 | 30321 |
| ASR_Table | 243 | 33404 |
| ASR_Table | 244 | 36488 |
| ASR_Table | 245 | 39572 |
| ASR_Table | 246 | 42912 |
| ASR_Table | 247 | 45483 |
| ASR_Table | 248 | 48824 |
| ASR_Table | 249 | 52165 |
| ASR_Table | 250 | 55506 |
| ASR_Table | 251 | 59103 |

FIG. 7 ion. For example, these radars are increasingly used in
SYSTEM AND METHOD FOR TARGET DETECTION WITH A RADAR ANTENNA

BACKGROUND OF THE INVENTION

This invention relates generally to radar systems, and more particularly, to a system and method for object detecting with a radar system.

Radar systems, and in particular, millimeter-wave pulsed Doppler radars are increasingly used for different applications. For example, these radars are increasingly used in automotive applications, including automotive sensor systems for cruise control, parking aid, stop and go control, pre-crash avoidance, etc. These radars also are used in other applications, for example, military and satellite tracking systems.

Known pulsed Doppler technology uses an amplitude sensing ratio (ASR) of the sum and difference patterns to determine target angle information. Essentially, the sum pattern and a delta pattern amplitude ratio are used to determine the target angle. This is also sometimes referred to as a switching lobe radar (SLR) system. The sum and delta patterns are typically obtained by signal combination and subtraction of two columns of an antenna array. The ASR value and a phase difference (PD) are determined based on the properties of the radar (sensor) and the target appearance angle toward the sensor. Accordingly, the characteristics of the ASR and PD are often used for target angle determination, where the ASR value is used to determine the absolute target angle and the PD value is used to determine whether the target is on the left or right side of the sensor (i.e., negative or positive angle with reference to the boresight of the sensor). A switch is used to change the phase difference between the two columns of the antenna arrays between zero degrees and 180 degrees and to maintain equal amplitude at the two antenna columns.

In general, a radiation lobe is typically defined as a portion of a radiation pattern bounded by regions of relatively weak radiation intensity. The main lobe is a high radiating energy region. Other lobes are typically called sidelobes and the lobe radiating in the counter direction to the desired radiation direction is typically called the back lobe. Regions for which the radiation is very weak are called nulls and the depth of the null defines how well the radiated signals cancel each other and, thus, can affect the performance of the system. The differential pattern for known radar systems often has a limited null depth resulting in reduced accuracy (e.g. angle resolution) of the detected target angle at the antenna boresight. In particular, the null location is at about the boresight of the sensor and any irregularities in this area directly affect the target angle detection accuracy. Accordingly, any small interference signal to the delta signal causes a large fluctuation of the ASR value, which may cause large ambiguity of the ASR value used by these known radar system for target detection. Thus, the antenna pattern of the sensor is very environment dependent resulting in ASR information used for target angle detection in known radar systems becoming inaccurate or possibly invalid. The reduced accuracy is even greater for smaller targets or targets located at a greater distance from the radar system because the SNR decreases due to the small reflection signal received.

BRIEF DESCRIPTION OF THE INVENTION

In one exemplary embodiment, a method for determining angular information for an object using a radar system is provided. The method includes generating a first single beam antenna pattern, generating a second single beam antenna pattern and transmitting the first and second single beam antenna patterns. The method further includes using phase detection to determine angular information for a detected object based on a phase difference of received signals.

In another exemplary embodiment, a method of controlling a radar system to determine angular information for a detected object is provided. The method includes powering a first and a second antenna array column of an antenna to generate a first antenna pattern and powering only the first antenna array column to generate a second antenna pattern. The first antenna pattern is narrower than the second antenna pattern. The method further includes performing phase detection on reflected signals from the first and second antenna patterns to determine angular information for a detected object.

In yet another exemplary embodiment, a pulsed Doppler radar system is provided that includes a transmitter configured to transmit pulses, a receiver configured to receive reflected signals from the pulses, and an antenna configured to generate a first antenna pattern and a second antenna pattern. The pulsed Doppler radar system further includes a processor configured to determine angle information for a detected object based on phase detection of reflected signals from the first and second antenna patterns.

DETAILED DESCRIPTION OF THE INVENTION

Various embodiments of the invention provide a radar system using two antenna patterns for target angle detection. In the various embodiments, a phase-detection-pulsed Doppler radar system or switching lobe radar (SLR) uses two single broad beam antenna patterns with different beam widths and phase detection to determine angle information. However, it should be noted that the various embodiments may be used in connection with different radar systems, for example, a monopulse radar system.

Figure 1:
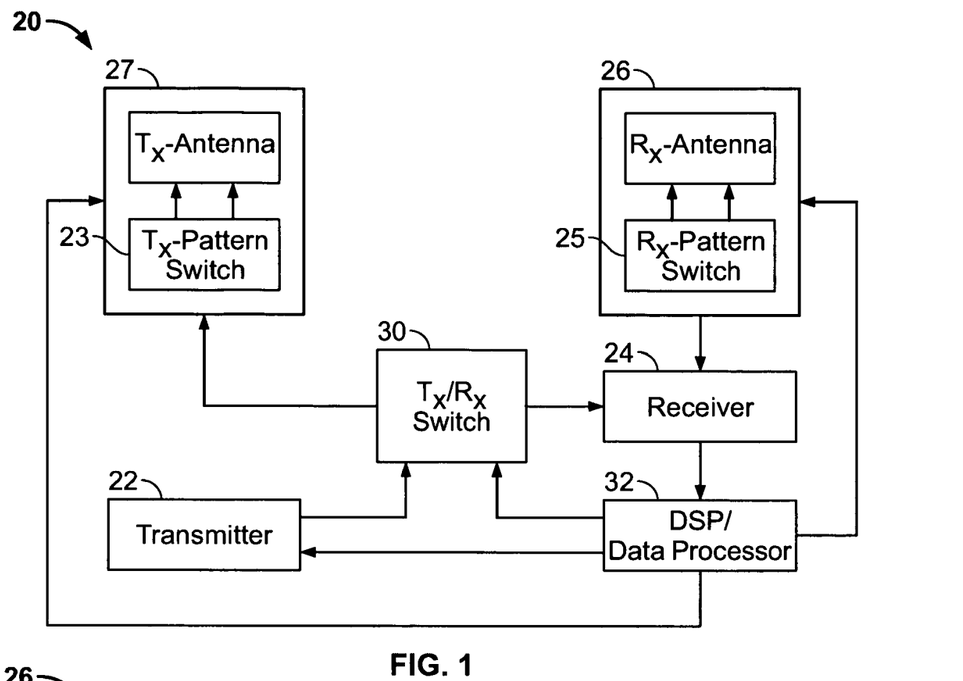
FIG. 1 is a block diagram of a radar system constructed in accordance with an embodiment of the invention.

A radar system constructed according to various embodiments of the invention is shown in FIG. 1. The radar system 20 is provided in one embodiment in a pulsed Doppler configuration that generally includes a transmitter 22 connected to a transmit antenna (Tx-antenna) 27, through a transmit/receive (Tx/Rx) switch 30. The Tx-antenna 27 may include, for example, a pattern switch 23. A receiver 24 is connected to a receive antenna (Rx-antenna) 26 the Tx/Rx switch 30 and a signal processor, for example, a digital signal processor (DSP)/data processor 32. The Rx-antenna 26 may include, for example, a pattern switch 25. The DSP/data processor 32 is also connected to the transmitter 22, and the Tx-antenna 27 through the Tx/Rx switch 30. The Tx/Rx switch 30 may be connected to each of the Rx-antenna 26 and Tx-antenna 27 as a local oscillator.

In operation, the radar system 20 operates in a pulsed Doppler operation mode transmitting pulses from Tx-antenna 27, with the return signals from a first set of pulses received for a first Rx-antenna beam of configuration and then the return signals from a second set of pulses received for a second Rx-antenna beam configuration using the receiver 24 and Rx-antenna 26. The antenna beam configuration is controlled by the Rx-pattern switch 25. The Rx-pattern switch 25 may include, for example, a pair of PIN switch diodes (not shown) as is known to switch between the two different antenna beam configurations. For example, in one embodiment with two antenna arrays, the Rx-antenna 26 may include two sets of patch antennas (shown in FIG. 6) each offset from the antenna boresight, which is the physical axis of the directional antenna. The Tx/Rx switch 30 may include, for example, two pairs of PIN diodes (not shown) as is known to switch the RF signal from the transmitter to either the Tx-antenna 27 or receiver 24 as a "local oscillator" to activate the receiver 24. The receiver 24 may include a plurality of receiver subsystems (not shown) that receives the return signals either in one of the first and/or second antenna beam configurations.

Accordingly, the radar system 20 may be provided with both the sum and the difference of the two return signals. Various embodiments of the invention process this information to control the Rx-antenna 26 (e.g., rotate the antenna) and to attempt to maximize the sum and minimize the difference. For example, the DSP/data processor unit 32 may adjust the phase value, amplitude value, altitude value, azimuth value, etc. of the signal. In various embodiments, additional antenna elements may be provided, for example, four sets of antenna groups may be provided to track a target along two axes. It should be noted that modifications to the Rx-antenna 26 are contemplated, for example, a common transmitting and receiving antenna may be provided to operate with a duplexer system. In various embodiments, a multiple beam system of the Tx-antenna 27 with the pattern switch 23 may be used with a single beam Rx-antenna 26.

In the various embodiments, at least one of the Rx-antenna 26 and Tx-antenna 27 are configured having a plurality of antenna array columns (shown in FIG. 6), for example, two antenna array columns configured having a plurality of antenna members (e.g., antenna patch members) in any known manner. The Rx-antenna 26 or Tx-antenna 27 in these embodiments are switchable antenna arrays. In this configuration, the signal wave characteristic may be switched (e.g., sequentially) between at least two different patterns, such as a reference pattern and an error pattern. A switchable phase shifter (not shown) may be used, for example, between the two antenna arrays to create 0° and 180° phase shifts (e.g., radiation angles from 0 degree to about +/−30 degrees), resulting in reference and error signal patterns. In various embodiments, the phase shift is the same for both antenna array columns. The resulting patterns may have a focused beam at a boresight and a notch at boresight, respectively, as described in more detail herein. Using pulsed Doppler theory, bearing information, such as target angular information may be extracted by processing the return signals of both sensor stages.

Figure 2:
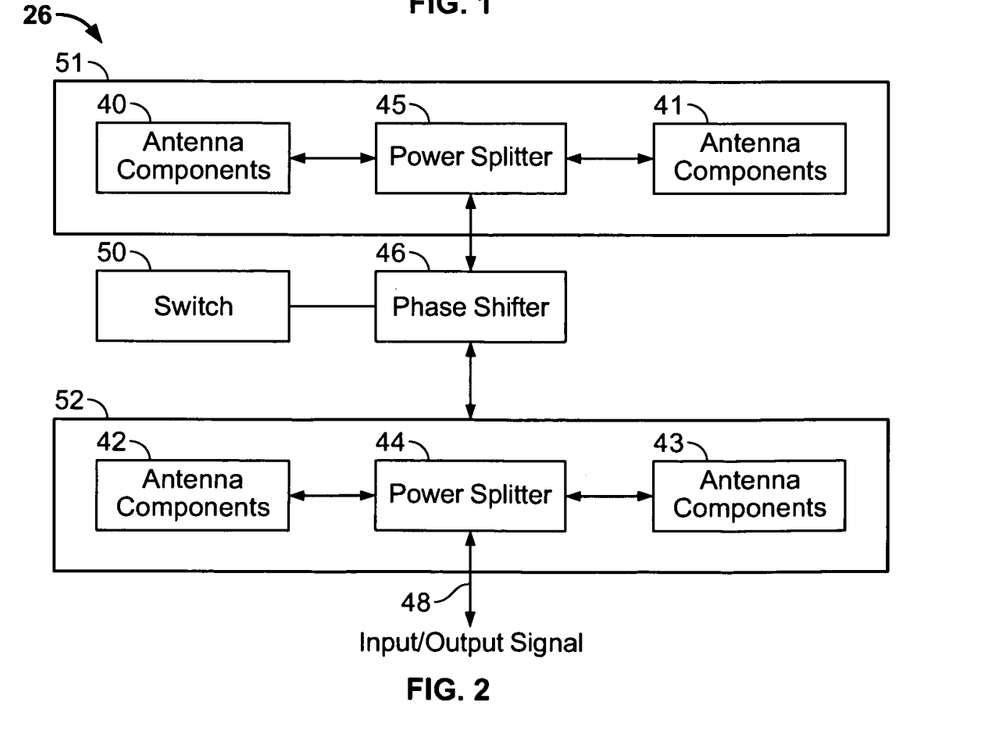
FIG. 2 is a block diagram of an antenna of the radar system of FIG. 1.

The Rx-antenna 26 may be provided in different configurations. For example, as shown in FIG. 2, the Rx-antenna 26 may include a plurality of antenna components 40, 41, 42 and 43, which may be, for example, separate antenna array columns such as a patch antenna array having two columns of array elements. For example, antenna components 40 and 41 may form one column 51 and antenna components 42 and 43 may form another column 52. A power splitter 44 may be connected directly to the antenna components 42 and 43, and through a phase shifter 46 to a second power splitter 45. The power splitter 45 may be connected directly to the antenna components 40 and 41. In an exemplary embodiment, the power splitter 44 is configured to define an amplitude ratio between the two antenna columns 51 and 52 and to provide impedance matching to the input (or output if referring to the Tx-antenna 27) signal 48. For example, a portion of the energy from the input signal may be split into antenna column 51 and the remaining portion of the signal energy provided to the antenna column 52 with an absolute phase difference of n*360 degrees or n*360+180 degrees where n is an integer number, (a relative phase difference of zero degrees or 180 degrees). It should be noted that the Tx-antenna 27 may be provided in a similar configuration to the Rx-antenna 26 shown in FIG. 2.

Phase shifting may be provided using the phase shifter 46, which in alternate embodiments, is included as part of the DSP/data processor unit 32 (shown in FIG. 1). The phase shifter 46 may be controlled by a switch 50 connected thereto. Additionally, the phase shifter 46 may be provided with a phase-modulated transmitter signal as described in more detail herein. The switch 50 may be controlled, for example, based on receive control signals from the DSP/data processor 32 (shown in FIG. 1). For example, appropriate switching transistors and/or diodes, and biasing circuitry may be provided in any known manner. It should be noted that the phase shifter 46 may be configured to introduce phase shift into the transmitted and/or received signal and formed from a microstrip, coaxial phase shifter, a switched waveguide element, etc.

The components of the various embodiments may be constructed of different materials, for example, semiconductor material. Further, and for example, the pulses provided by the radar system 20 may be generated in different frequency bands, such as different microwave, millimeter wave, and other radio frequency bands. Additionally, the Rx-antenna 26 and/or Tx-antenna 27 and components thereof may be formed of standard antenna arrays as are known. The transmitter 22 and receiver 24 may include any RF switching device, such as using a field effect transistor (FET) switch, Schottky diodes, PIN diodes, etc. that are switched on and off using a pulse source (e.g., oscillator) as is known.

Figure 7:
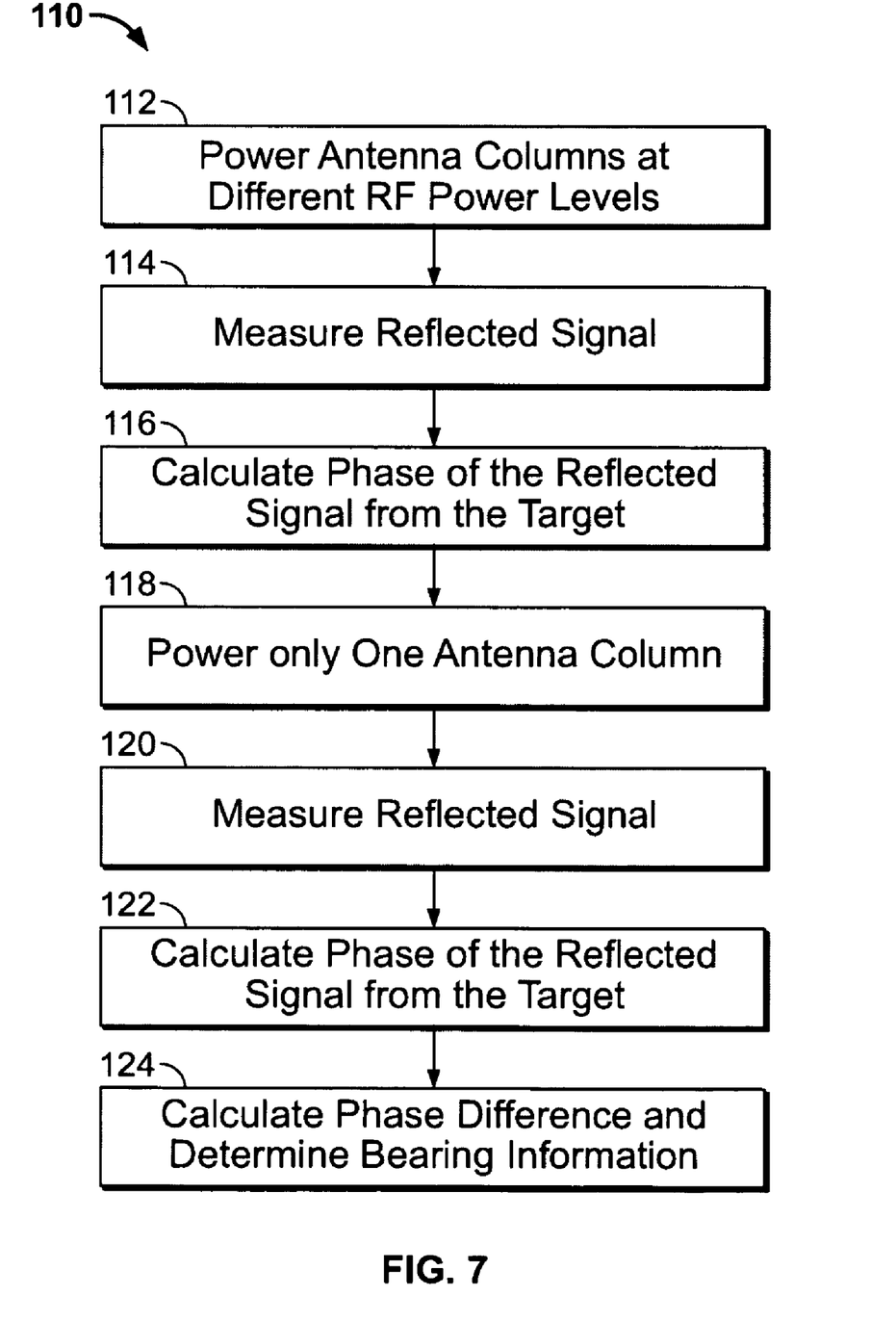
FIG. 7 is a flowchart of an method to determine bearing information in accordance with an embodiment of the invention.

Various embodiments of the invention control the radar system 20 to provide a sensor architecture having linear phase characteristics for high resolution sensor systems by means of phase detection. In particular, a method 110 to determine bearing information is shown in FIG. 7 and uses two single beam antenna patterns with different beam widths resulting in the phase difference slope between the two patterns becoming more linear. Specifically, the antenna columns 51 and 52 define an outer, or a second column (e.g. column 51) of an antenna array and an inner, or first column of an antenna array (e.g., column 52), respectively, and which together may form the antenna 26.

Specifically, at 112 in a first mode of operation, the antenna column 51 is provided with a higher RF power than the antenna column 52, for example, a three decibel (3-dB) higher power output, and an equal phase to the antenna column 52, to generate a narrower antenna pattern. Thereafter, at 114, a reflected signal is measured to determine the existence or presence of a target. Then, at 116, the phase of the reflected signal is calculated. The measuring of the reflected signal at 114 and the calculation of the phase of the reflected signal at 116 may be performed using any known signal processing technique.

Once the phase calculation is complete, or alternatively, during the phase processing, a second mode of operation is then provided. More particularly, at 118 a wider antenna radiation pattern is generated by providing power, and in particular, RF power, to only one antenna column, for example, antenna column 52. In this second mode of operation the other antenna column, for example antenna column 51 is isolated. Thereafter, at 120, a reflected signal from the target determined at 114 is measured. The phase of the reflected signal from target (i.e., from the wider antenna pattern) is calculated at 122. The phase difference (PD) between the calculated phases for the reflected signals from the narrower and wider antenna patterns is then determined at 124. Bearing information also then may be determined as described herein.

The method 110 describes a process for generating two transmit antenna patterns by selectively powering two antenna columns and thereafter determining phase information based on reflected signals. Accordingly, and with reference to FIG. 1, the Tx-pattern switch 23 may selectively power two columns of the Tx-antenna 27 to transmit the different antenna patterns with only a single receive antenna column of the Rx-antenna 26 receiving the reflected signal. In this embodiment, the Rx-pattern switch 25 may not be used or may not be present. Alternatively, the Tx-antenna 27 may include a single antenna column with the Tx-pattern switch 23 not used or not present. In this configuration, the Rx-antenna 26 includes two columns that are selectively enabled in a similar manner described in the method 110 with respect to the transmit antenna columns to detect reflected signals first with a narrower receive antenna pattern (e.g., two columns of the Rx-antenna 26 enabled at different RF power levels) and then with a wider receive antenna pattern (e.g., only one column of the Rx-antenna 26 enabled and one column isolated). Essentially, the Tx-antenna 27 transmits signals with a single column antenna configuration and the Rx-antenna 26 receives reflected signals using a combination of two antenna columns.

Figure 3:
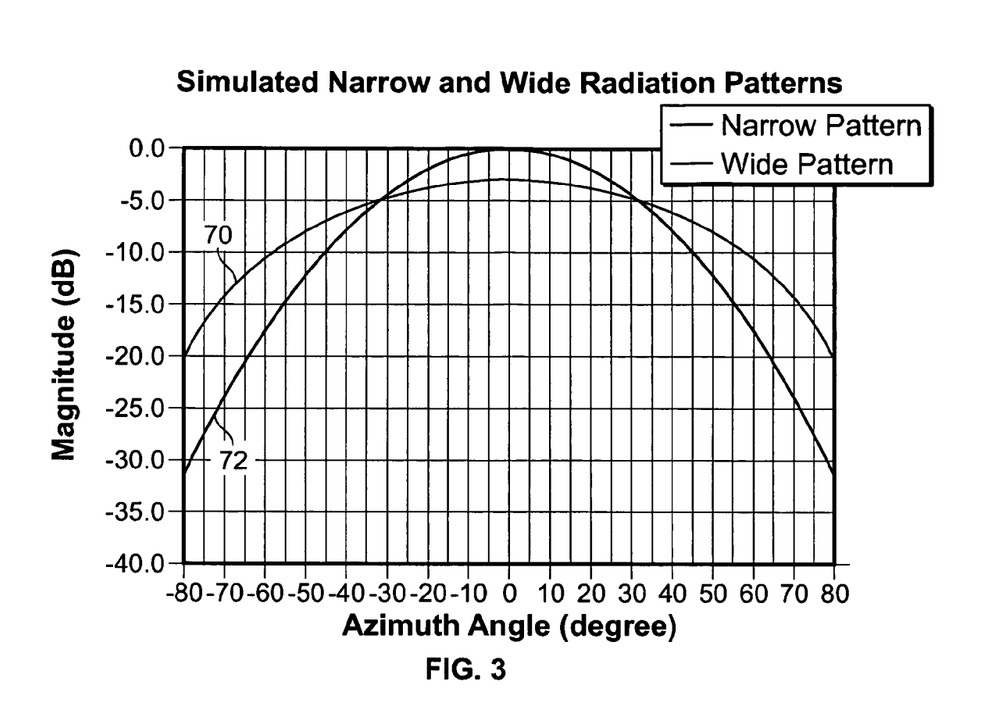
FIG. 3 is a chart showing two radiation patterns generated by the radar system of FIG. 1.

It should be noted that in order to provide continuous measurements of the PD, the method 110 controls the radar system 20 to switch between the two antenna patterns over a radiation angle coverage of, for example, between about −90 degrees to about +90 degrees. It further should be noted that the radiation angle (e.g., lobe switching) may encompass a smaller range, for example, over a radiation angle of between about −40 degrees to about +40 degrees. In an exemplary embodiment, and as shown in FIG. 3, the narrower antenna pattern (illustrated by curve 70) at the 3 dB point is between about +/−27 degrees and the wider antenna pattern (illustrated by curve 72) is between about +/−40 degrees at half power beam width.

Figure 4:
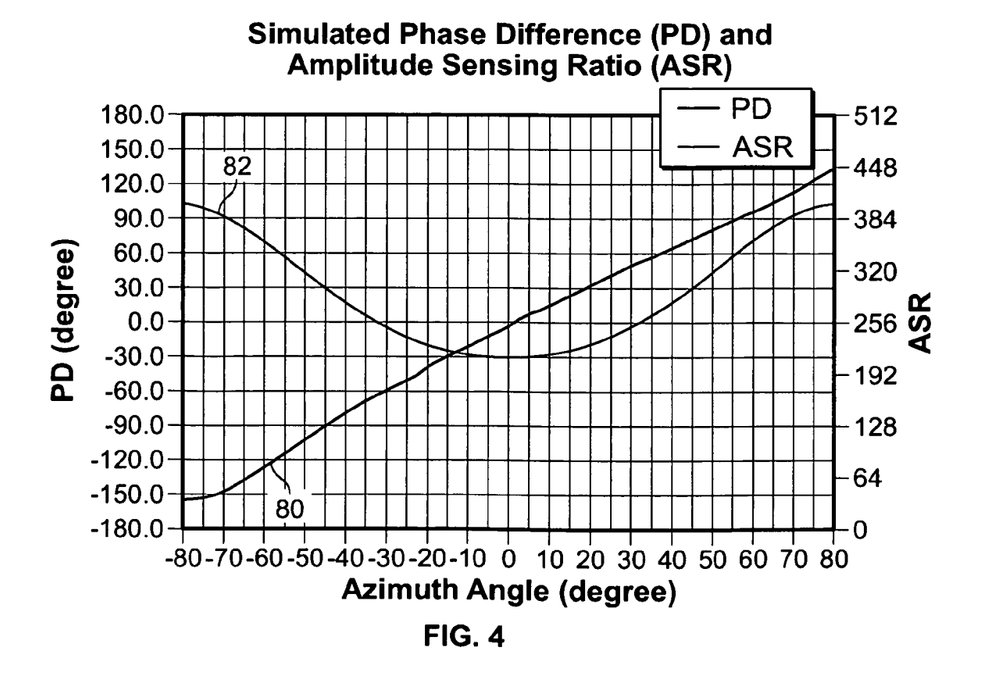
FIG. 4 is a chart showing a phase difference (PD) curve and an amplitude sensing ratio (ASR) curve for the radar system of FIG. 1.

Using the switching and changing of radiation angle coverage, bearing data for an object (at 124 of the method 110), such as angular information, within the radiation angle range may be obtained using PD information (e.g., PD curve) generated based on the reflected signals in any known manner and as described in more detail below. It should be noted that in the various embodiments, the phase difference between the first and second antenna patterns becomes almost linear from −180 degrees to +180 degrees for a radiation angle from −90 degrees to +90 degrees as shown in FIG. 4 (the PD curve 80 is almost linear and the ASR curve 82 is curved). Using the PD curve 80 the azimuth angle of an object may be determined (e.g., angular estimation or bearing information). For example, if the object is determined to be at a PD of about −30 degrees, then using the PD curve 80, the azimuth angle of the object is about −15 degrees. In the various embodiments, the PD curve 80 may be used to determine the elevation angle of an object using different arrangements of the two antenna columns. Also, in various embodiments, additional antenna elements also may be provided, for example, four sets of antenna groups may be provided to determine both the azimuth and the elevation angle of an object.

Figure 5:
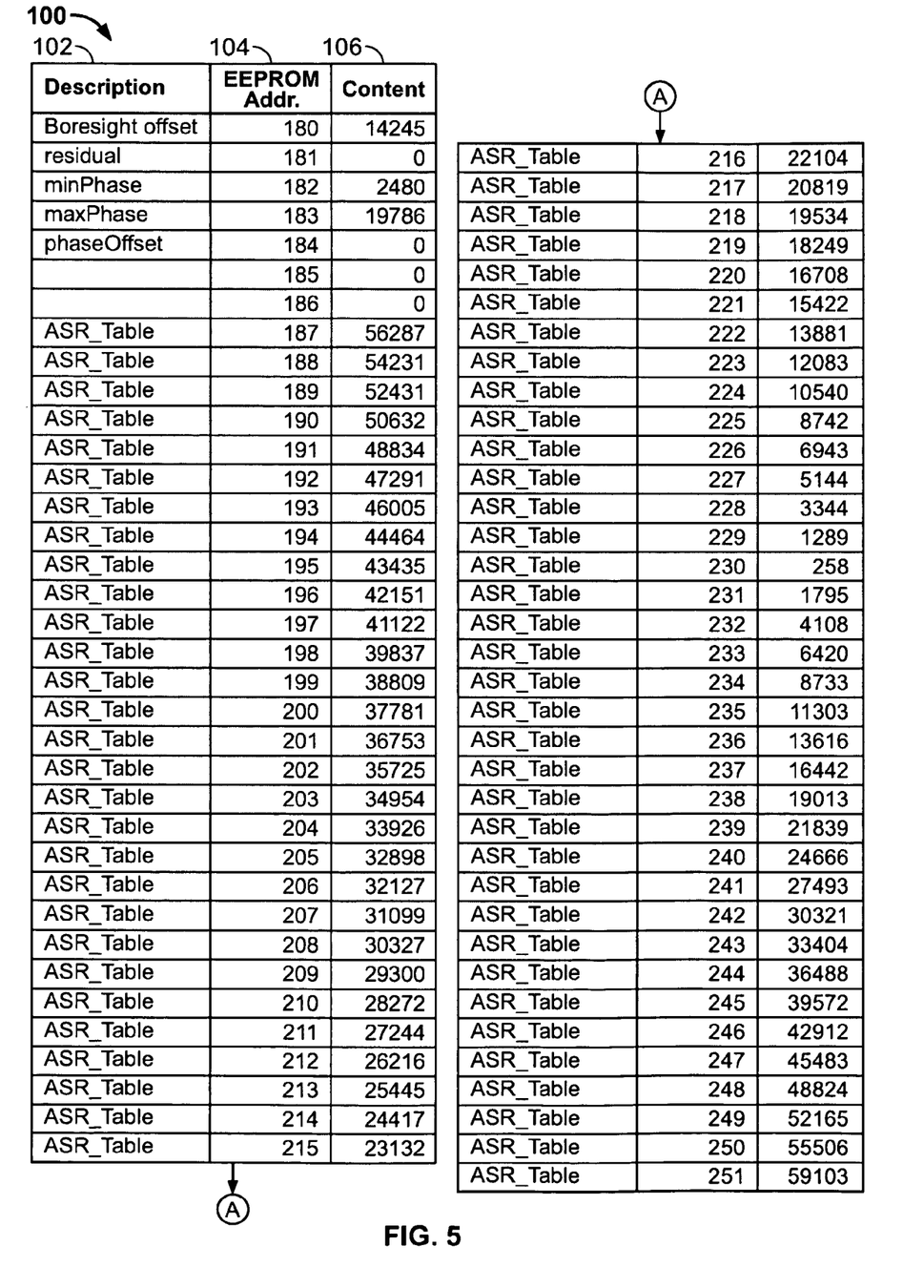
FIG. 5 is a PD lookup table formed in accordance with an embodiment of the invention.

As part of determining the bearing information at 124, a PD lookup table 100 as shown in FIG. 5 may be generated based on the PD curve 80 and stored in memories (e.g., EEPROM) of the radar system 20. The PD lookup table 100 is for illustrative purposes only such that data therein and the format of the table may be changed as desired or needed. In the exemplary embodiment, the lookup table 100 may include a first column 102 providing a description of the type of information stored at a memory location or address of the memory as indicated in a second column 104. The information, for example, PD information is provided in the third column 106. For example, in the exemplary embodiment, the address #180 stores a PD value at the negative and positive target angle cross point and referred to as the boresight offset. If the PD value is smaller than this value, the radar system 20 will report a negative angle (e.g., output to a user on a display), otherwise a positive angle will be reported. In addresses locations #182 and #183 the lower and upper limits, respectively of the PD value are stored. In operation, if an object (e.g., target object) is detected by the radar system 20, the raw PD value from the target ranging from −180 degrees to +180 degrees is measured. The reported PD value stored may be scaled, for example, scaled between −32768 and +32768. For a report angle calculation, the value will be scaled again based on the following Equation 1:

$$PDnew = PD/2 + 16384 \quad (1)$$

The scaling is provided with a plus 180 degrees offset for zero degrees to 360 degrees with a scale from 0 to 32768.

The PDnew value is scaled again by the upper and lower limits based on the following Equation 2:

$$PDfinal = (PDnew - lower\_limit) * 32768 / (upper\_limit - lower\_limit) \quad (2)$$

Using Equations 1 and 2, the lookup table index can be determined based on the following Equation 3:

$$PDfinal / 256 \quad (3)$$

at a byte-format address.

Figure 6:
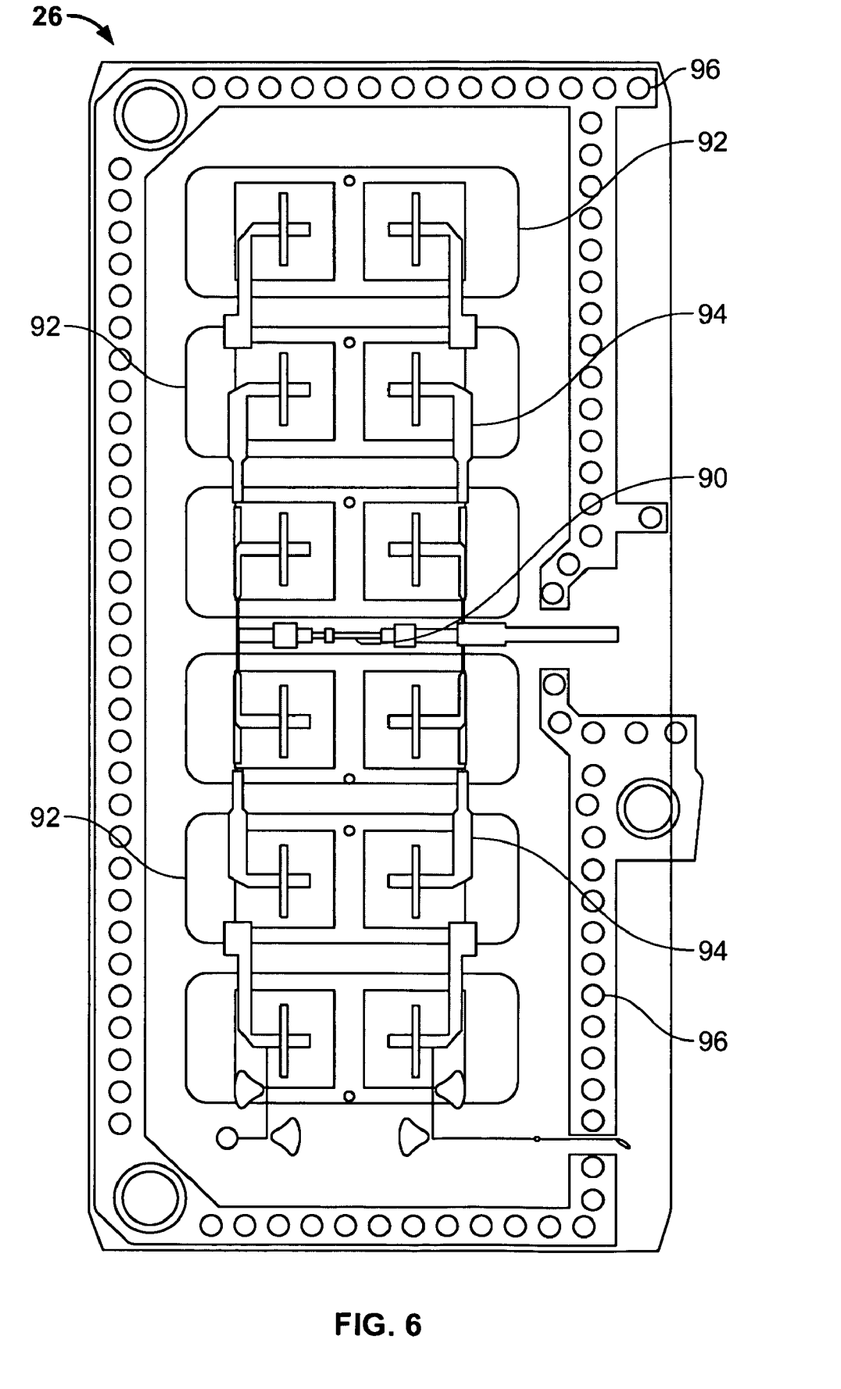
FIG. 6 is a diagram of an antenna of the radar system of FIG. 1 illustrating a single switching diode.

It should be noted that in the various embodiments, the antenna 26 may be constructed with a single pole, single throw (SPST) switch 90, for example a single switching diode, as shown in FIG. 6, thereby providing a simpler and more cost effective antenna feeding structure. The SPST switch 90 is used to switch the antenna 26 between the narrower and broader antenna patterns. In various embodiments, the SPST switch 90 may consist of PIN diodes, transistors, or in other forms as known in various circuits or integrated circuits, etc. In general, the antenna 26 may be formed of a plurality of patch antenna components 92 (on the outer side of a substrate) interconnected with a feed system 94 as is known. A plurality of grounding vias 96 also may be provided as is known. Although the antenna 26 is shown as a two by six patch array for transmitting and receiving signals defining two antenna columns of six elements each, the configuration and number of patch elements may be modified as desired or needed.

Thus, various embodiments of the invention provide a radar system that uses the phase difference to determine bearing information. In particular, the radar system generates two single beam antenna patterns with a one beam being wider than the other beam.

The various embodiments or components, for example, the radar system 20, components or controllers therein, may be implemented as part of one or more computer systems, which may be separate from or integrated with the radar system 20. The computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention, for example, for generating two antenna patterns having different widths. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for determining angular information for an object using a radar system, said method comprising: generating a first single beam antenna pattern;
generating a second single beam antenna pattern;
transmitting the first and second single beam antenna patterns, wherein the first single beam antenna pattern is narrower than the second single beam antenna pattern; and
using phase detection to determine angular information for a detected object based on a phase difference of received signals.

2. A method in accordance with claim 1 further comprising calculating a phase for the received signals and wherein using phase detection comprises using a phase difference determined from a difference of the calculated phases of the received signals from the transmitted first and second single beam antenna patterns.

3. A method in accordance with claim 1 wherein the first and second single beam antenna patterns are generated by first and second antenna array columns of an antenna of the radar system.

4. A method in accordance with claim 3 further comprising configuring the second antenna array column at a higher power level than the first antenna array column.

5. A method in accordance with claim 4 wherein the second antenna array column is at about a three decibel higher power level than the first antenna array column.

6. A method in accordance with claim 3 further comprising powering both the first and second antenna array columns to generate the first single beam antenna pattern and powering one of the first and second antenna array columns to generate the second single beam antenna pattern.

7. A method in accordance with claim 3 wherein the first and second antenna array columns are configured as inner and outer arrays within an antenna housing.

8. A method in accordance with claim 1 further comprising covering a radiation angle of the first and second single beam antenna patterns between about −90 degrees and +90 degrees.

9. A method in accordance with claim 1 further comprising changing a radiation angle coverage of the first and second single beam antenna patterns between about −40 degrees and +40 degrees.

10. A method in accordance with claim 1 wherein the half power beam width of the first single beam antenna pattern is about +/−27 degrees and the half power beam width of the second single beam antenna pattern is about +/−40 degrees.

11. A method in accordance with claim 1 further comprising generating a lookup table based on phase difference information to determine an angular estimation for the detected object.

12. A method in accordance with claim 1 further comprising configuring the radar system to operate in a pulsed Doppler operation mode.

13. A method of controlling a radar system to determine angular information for a detected object, said method comprising:
powering a first and a second antenna array column of an antenna to generate a first single beam antenna pattern;
powering only the first antenna array column to generate a second single beam antenna pattern, the first single beam antenna pattern narrower than the second single beam antenna pattern; and
performing phase detection on reflected signals from the first and second single beam antenna patterns to determine angular information for a detected object.

14. A method in accordance with claim 13 wherein the second antenna array column is configured to be powered at a higher power level than the first antenna array column.

15. A method in accordance with claim 13 wherein the phase detection comprises determining phase difference information based on phase calculations for the reflected signals.

16. A pulsed Doppler radar system comprising:
- a transmitter configured to transmit pulses;
- a receiver configured to receive reflected signals from the pulses;
- an antenna configured to generate a first antenna pattern and a second antenna pattern, wherein the first antenna pattern is narrower than the second antenna pattern;
- a switch to switch between the first antenna pattern and the second antenna pattern; and
- a processor configured to determine angle information for a detected object based on phase detection of reflected signals from the first and second antenna patterns.

17. A pulsed Doppler radar system is accordance with claim 16 wherein the antenna comprises plurality of antenna components including a first antenna array column and a second antenna array column, the first antenna array column is powered at a higher power level than the second antenna array column, and wherein the first antenna pattern is generated by powering both the first and the second antenna array columns and the second antenna pattern is generated by powering only the first antenna array column.

18. A pulsed Doppler radar system is accordance with claim 16 further comprising a single single pole, single throw (SPST) switch to control switching between the first antenna pattern and the second antenna pattern.

19. A method in accordance with claim 1 further comprising determining angular information for a detected object without using amplitude difference information.

* * * * *